April 28, 1953     J. PERZEL     2,636,923
LOW CAPACITANCE CABLE AND METHOD OF MAKING THE SAME
Filed Dec. 30, 1948
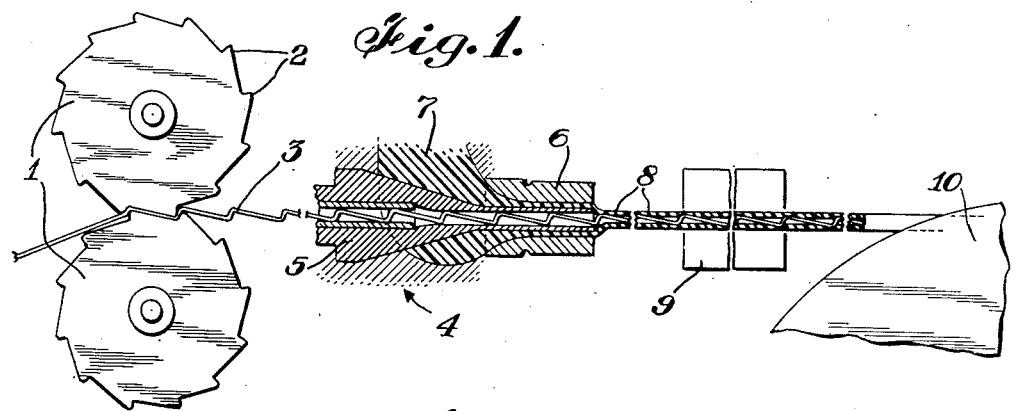
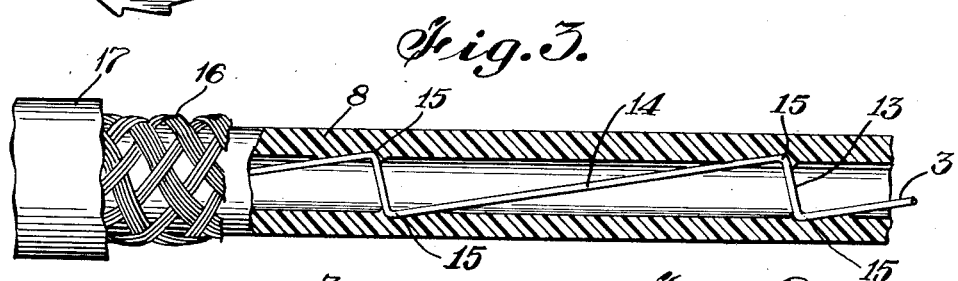
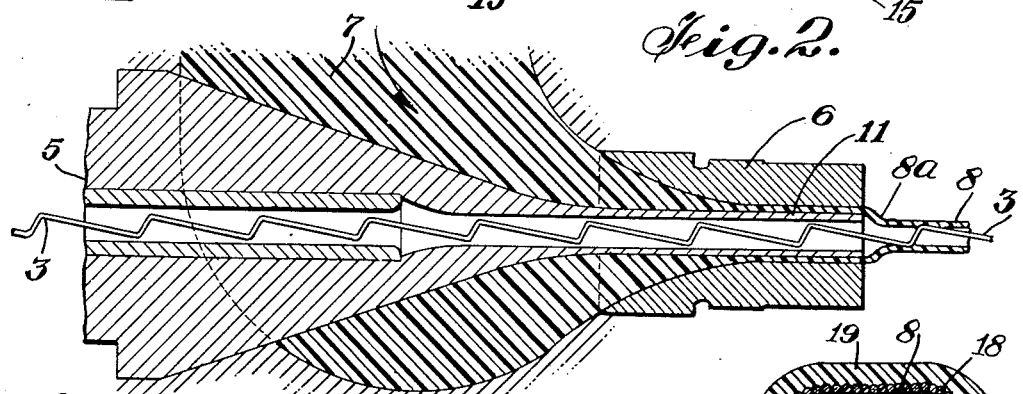
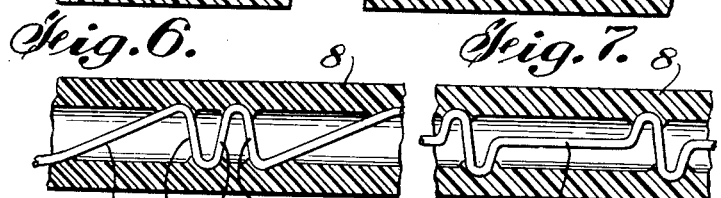
INVENTOR
JOHN PERZEL
BY *Percy P. Lantz*
ATTORNEY Patented Apr. 28, 1953

2,636,923

UNITED STATES PATENT OFFICE 2,636,923

LOW CAPACITANCE CABLE AND METHOD OF MAKING THE SAME

John Perzel, Garfield, N. J., assignor to Federal Telephone and Radio Corporation, New York, N. Y., a corporation of Delaware Application December 30, 1948, Serial No. 68,132

9 Claims. (Cl. 174—28)

The present invention relates to electric cables and, more particularly to improvements in air space coaxial cables and the method of making same.

In certain installations where it is necessary to use shielded electric cable a maximum utilization of air as the dielectric is desirable in order to reduce capacitance and dielectric loss. Where a tubing of insulation is used to contain the center conductor of the cable, the conductor is sometimes formed with spaced transverse portions or kinks and threaded into short lengths of cable as needed. Conductors thus threaded may have only a very small portion in contact with the tubing, with the remainder of the conductor supported in the air space of the tubing. However, in cables of this character heretofore proposed, the center conductors are not satisfactorily held in place and sometimes tend to come out during installation jobs or lose their shape, at least in part, whereby portions of relatively long lengths contact the tubing thus undesirably increasing the capacitance of the cable.

One object of this invention, therefore, is to provide an air space coaxial cable with the inner conductor held in place; and another object is to provide a method of making same so that the inner conductor is attached at spaced points to the dielectric material of the cable.

This I accomplish by impressing a sawtooth form or other periodic shape upon a conductor and feeding the conductor through an extrusion device directly into the dielectric tubing as the latter is being formed and set. The tubing is thus extruded in spaced relation for the most part about the conductor with the corners or other transverse extremities of the center conductor stuck or bonded to the tubing as the dielectric material sets. Preferably, the sawtooth or other form of conductor is provided with an overall transverse dimension slightly greater than the ultimate inner diameter of the tubing, whereby the corners of the formed conductor are at least partially sunk or embedded in the inner wall surface of the tubing thus insuring a good bond.

The above-mentioned and other features and objects of this invention and the manner of attaining them will become more apparent and the invention itself will be best understood, by reference to the following description of an embodiment of the invention taken in conjunction with the accompanying drawings, wherein:

Fig. 1 illustrates diagrammatically in longitudinal section apparatus employed in carrying out the steps of my method;

Fig. 2 is an enlarged view in longitudinal section of part of the apparatus used to illustrate the operation of my invention;

Fig. 3 is an enlarged view in longitudinal section of cable made in accordance with the principles of my invention;

Figs. 4, 5, 6, and 7, are views in longitudinal section, representing variations in the shape of the center conductor of the cable; and Fig. 8 is a cross-sectional view of a two-conductor cable made in accordance with the principles of my invention.

Referring to Fig. 1 the apparatus that may be used in practicing my invention may consist of two contiguous wire shaping wheels 1 having teeth 2 designed to bend the conductor 3 into the desired shape, an extrusion device 4 with nozzle 5 and die 6 between which plastic material at high temperature and pressure is extruded into partially set tubing 8, a cooling trough 9 which completes the setting, and a capstan 10 used to draw off and maintain the tubing under proper tension. A spark testing device and a take-up reel, not shown, may be used for testing and winding up the tubing.

The operation of this apparatus may best be explained by reference to Figs. 1 and 2. The conductor 3 is fed through the wire shaping wheels having teeth 2 designed preferably to shape the conductor into a sawtooth form having spaced transverse portions. The tooth edges are slightly rounded in order to prevent cutting of the wire. The formed conductor 3 is then fed through the nozzle 5 of the plastic extruding device 4. This nozzle has a long cylindrical tip 11 with an interior diameter slightly larger than the crosswise dimension of the formed conductor. The die 6 has a bore, slightly larger than the exterior diameters of the nozzle tip, within which the nozzle tip is concentrically disposed. The plastic tubing material 7 which may be polyethylene or other suitable dielectric material is shown flowing under pressure and elevated temperature in accordance with known practice through the space separating the nozzle tip 11 and the die 6 to form a tubing 8 around the conductor 3. As the tubing emerges from the extrusion device 4, its cross-sectional dimensions are diminished by a necking down operation at 8a brought about by the longitudinal tension placed on it by the capstan 10 and the softness of the material 7. Inasmuch as the cross-wise dimension of the transverse lengths of the formed conductor, measured on a line perpendicular to the axis of the tubing, is slightly greater than the diminished inner diameter of the tubing, the corners of the conductor 3 sink slightly into the plastic material of the tubing thus producing a bond between the formed conductor 3 and the partially set plastic material of the tubing 8 at regularly spaced intervals.

The tubing is drawn off through the cooling trough 9 by the capstan 10 whose speed is synchronized with the wire shaping wheels 1, and stored on take-up reels. By properly synchronizing the capstan with the wire shaping wheels the corners of the conductor are allowed to become bonded with the plastic tubing without undue strain.

The bonding effect is more apparent in the enlarged view of Fig. 3. The conductor 3 has a sawtooth shape with a short transverse length 13 disposed nearly at right angles to the axis of the tubing 8 and a long length 14 disposed at angles much smaller than a right angle to the axis of the tubing. The plastic material of the tubing 8, while still soft, is bonded with the extremity 15 of each successive sawtooth corner of the conductor 3 at regularly spaced intervals, as the tubing is being extruded in a spaced relationship around the conductor. By virtue of this bonding the conductor 3 is maintained in place within the tubing and the major part of the conductor is surrounded by an air space dielectric.

A conductive shielding 16 is subsequently applied to the exterior of the tubing 8 by a braiding machine, the criss-cross lays shown being made up of five and three wires, respectively. Other criss-cross lay combinations may, of course, be used, and if desired, the shielding may comprise a continuous layer of copper such as may be applied by electroplating. A jacket 17 of vinyl or other insulating material if thereafter extruded or otherwise applied thereon.

Two lengths of this tubing with internally bonded conductors may be used to manufacture the two-conductor cable illustrated in Fig. 8. A common shielding 18 is applied about the two lengths of tubing 8 and an external jacket 19 extruded thereon. A dual cable of this description is well suited for use as a low capacitance, low dielectric loss, television lead-in. It will also be understood that three or more tubes 8 with crimped conductors may be grouped in a single shield and jacket, and where desired each tube 8 may be provided with independent shielding.

The dimensions of the tubing and the conductor and the impressed form of the conductor may be varied, provided the relationship between the tubing and the conductor is such that a bonding will be effected between them as previously explained. For example, as in Figs. 4 and 5, the conductor may have the form of periodic sine waves, sawtooth waves, or variations thereof. A sawtooth form may be used having a long length 20 at a small angle to the axis and three short transverse lengths 21, 22, and 23, at approximately right angles to the axis, as in Fig. 6, so that each spaced portion of the conductor has the form of one long and one short tooth wherein a bonding with the tubing is effected at four points; or this may be modified so that the long length 24 substantially coincides with the axis of the tubing, as in Fig. 7, effecting a bond at two points in each spaced portion. The conductor 3 may, of course, be of any desired material capable of taking and maintaining an impressed shape. Other methods may also be utilized to shape the conductor to the desired form.

While I have described above the principles of my invention in connection with specific apparatus, it is to be clearly understood that this description is made only by way of example and not as a limitation to the scope of my invention.

I claim:

1. In a coaxial cable, a tubing of dielectric material, and a conductor in said tubing having longitudinally spaced, transversely extending crimped portions disposed in alternately different directions, the spaced portions of said conductor have a cross-wise diameter greater than the internal diameter of said tubing, whereby the extremities of said conductor are partially embedded in the inner wall of said tubing.

2. In a coaxial cable according to claim 1, wherein the said crimped portions of the conductor are disposed in substantially a single plane with the successive transversely extending extremities thereof being embedded alternately in opposing interior portions of said tubing.

3. In a coaxial cable according to claim 1, wherein the said spaced portions of the conductor are of sawtooth form.

4. In a coaxial cable according to claim 1, wherein the said spaced portions of the conductor have a periodic wave form.

5. In a coaxial cable, a tubing of dielectric material and a conductor disposed therein, said conductor being of sawtooth form, each sawtooth portion having a short length disposed substantially at right angles to the axis of the tubing and a long length disposed at angles smaller than a right angle to the axis of the tubing, the extremity of successive sawtooth peaks being embedded alternately in opposing interior portions of said tubing, whereby said conductor is maintained in place within the tubing and the major portion of the conductor is surrounded by an air space dielectric.

6. In the manufacture of coaxial cable, the method of substantially simultaneously feeding a conductor having spaced transversely extending portions disposed alternately in different directions, along a predetermined longitudinal path, and extruding dielectric material about said conductor in the form of a tube having an internal diameter less than the cross-wise dimension of the spaced portions of said conductor, whereby the extremities of said transversely extending portions of the conductor will become embedded in the inner wall of said tube.

7. In the manufacture of coaxial cable, the method comprising simultaneously extruding dielectric material in the form of tubing, and feeding into said tubing a conductor having spaced transversely extending portions disposed alternately in different directions, and in embedding the extremities of said transversely extending portions of the conductor in the inner wall of said tubing by applying tension to the take-off of the tubing from the point of extrusion sufficient to neck down the tubing while soft to an inner diameter less than the cross-wise dimension of the spaced portions of said conductor.

8. In a coaxal cable, a tubing of dielectric material and a conductor with longitudinally spaced crimped portions disposed therein, each of said crimped portions of the conductor having successively the form of one long and one short sawtooth, the long sawtooth having a long length disposed at a small angle to the axis of the tubing and a short length disposed approximately at right angles to the axis of the tubing, the short sawtooth having two short lengths disposed approximately at right angles to the axis of the tubing, the extremity of each successive sawtooth being at least slightly embedded in alternately opposing interior surfaces of said tubing, whereby said conductor is maintained in place within the tubing and the major portion of the conductor is surrounded by an air space dielectric.

9. In a coaxial cable, a tubing of dielectric material and a conductor with longitudinally spaced crimped portions disposed therein, each of said crimped portions of the conductor having successively a long length substantially coincidental with the axis of the tubing, a short transverse length extending from the axis of the tubing to one interior surface of the tubing, a second short transverse length extending between said one interior surface and the opposing interior surfaces of the tubing, and a third short transverse length extending from said opposing surface to the axis of said tubing, the extremities of the spaced portions of said conductor being alternately at least slightly embedded in opposing interior surfaces of said tubing, whereby said conductor is maintained in place within the tubing and the major portion of the conductor is surrounded by an air space dielectric.

JOHN PERZEL.

References Cited in the file of this patent

UNITED STATES PATENTS

| Number | Name | Date |
|---|---|---|
| 479,525 | Perrine | July 26, 1892 |
| 2,153,174 | Collard | Apr. 4, 1939 |
| 2,466,271 | Pfleumer | Apr. 5, 1949 |
| 2,481,181 | Walter | Sept. 6, 1949 |
| 2,501,690 | Prendergast | Mar. 28, 1950 |
| 2,503,834 | Mol | Apr. 11, 1950 |
| 2,510,358 | Wolf | June 6, 1950 |
| 2,513,106 | Prendergast | June 27, 1950 |

FOREIGN PATENTS

| Number | Country | Date |
|---|---|---|
| 452,713 | Great Britain | Aug. 31, 1936 |
| 457,514 | Great Britain | Nov. 30, 1936 |
| 460,591 | Great Britain | Feb. 1, 1937 |